No. 819,790. PATENTED MAY 8, 1906.
K. T. NESTE.
CURRYCOMB.
APPLICATION FILED OCT. 31, 1905.
2 SHEETS—SHEET 1.
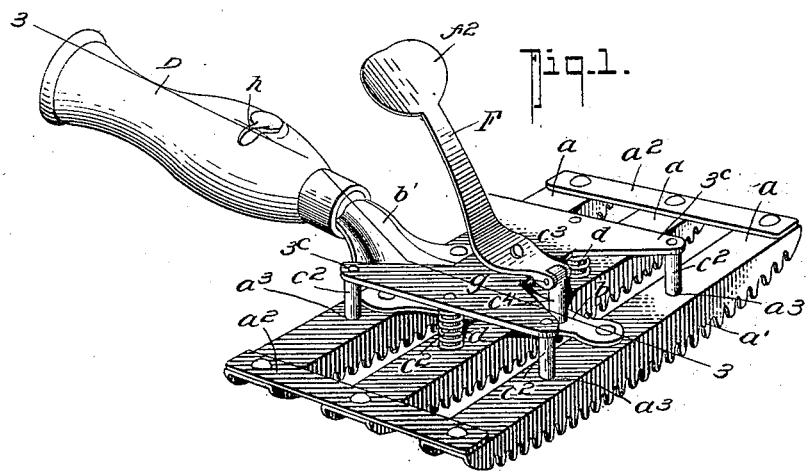
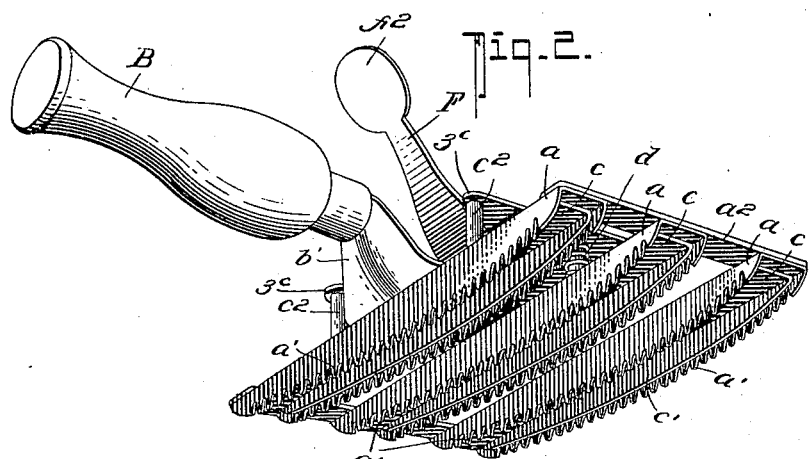
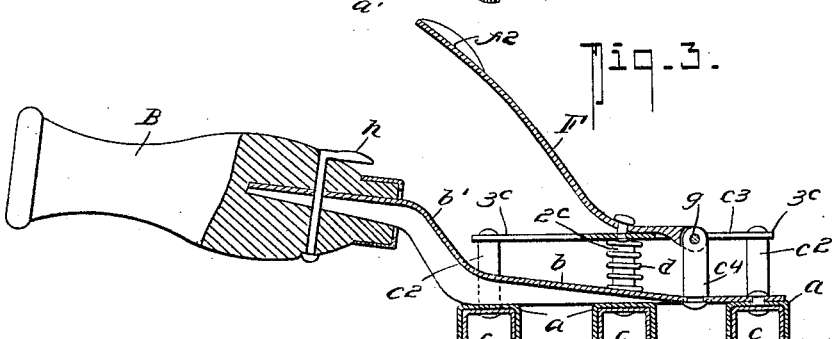
WITNESSES:
F. C. Gibson.
John J. Achrott.
INVENTOR
Knut T. Neste,
BY
Fred G. Dieterich & Co.
ATTORNEYS No. 819,790. PATENTED MAY 8, 1906.
K. T. NESTE.
CURRYCOMB.
APPLICATION FILED OCT. 31, 1905.

2 SHEETS—SHEET 2.

WITNESSES:
F. C. Gibson.
John D. Schrott.

INVENTOR
Knut T. Neste.

BY
Fred G. Dieterich & Co
ATTORNEYS

UNITED STATES PATENT OFFICE.

KNUT T. NESTE, OF MADISON TOWNSHIP, WINNESHIEK COUNTY, IOWA.

CURRYCOMB.

No. 819,790. Specification of Letters Patent. Patented May 8, 1906.

Application filed October 31, 1905. Serial No. 285,342.

*To all whom it may concern:*

Be it known that I, KNUT T. NESTE, residing in Madison township, in the county of Winneshiek and State of Iowa, have invented a new and Improved Currycomb, of which the following is a specification.

My invention, which relates generally to that type of currycombs having teeth-cleaner devices, more especially has for its object to provide a self-cleaning currycomb in which the cleaner devices are arranged to serve as means for scraping short-haired horses and horses when shedding hair, and it comprehends an improved arrangement and combination of parts whereby under one adjustment the cleaner devices can be actuated for expeditiously cleaning the comb teeth to remove therefrom the dirt, hair, &c., and under another adjustment to render the combing action ineffective and act as a scraper.

In its subordinate features my invention consists in certain details of construction hereinafter fully explained, pointed out in the claims, and illustrated in the accompanying drawings, in which—

Figure 4:
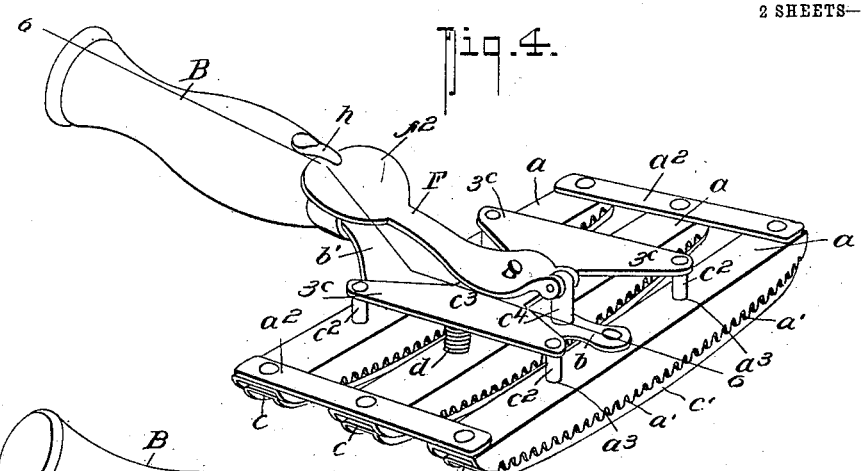
Figure 5:
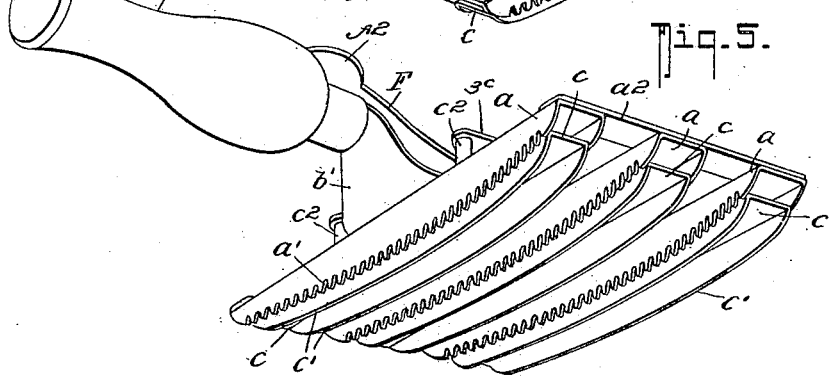
Figure 6:
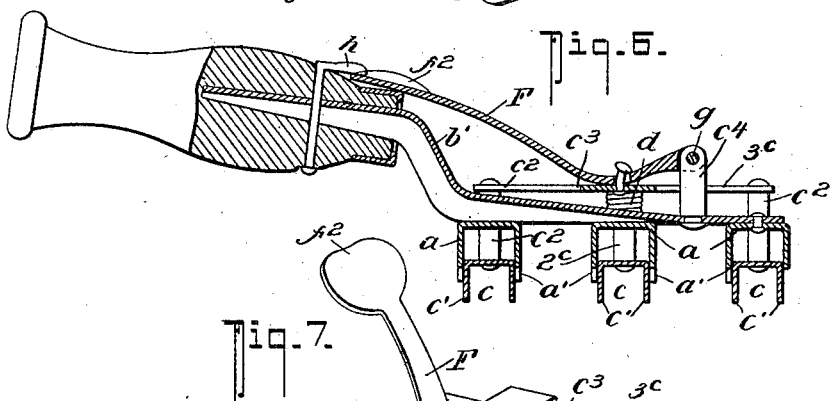
Figure 7:
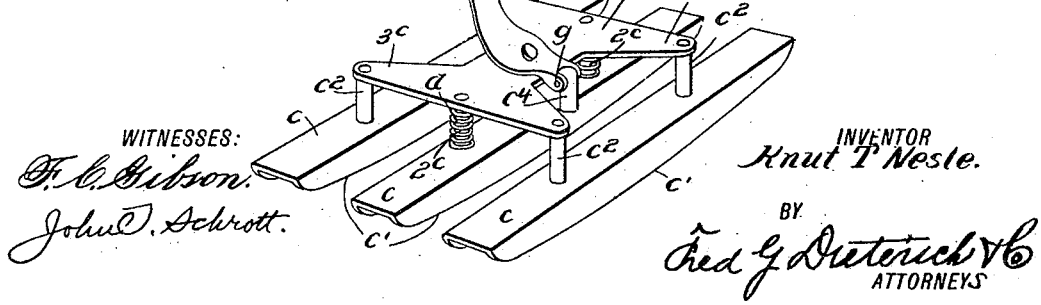

Figure 1 is a perspective view of my combined combing and scraping device, showing the same arranged as a currycomb. Fig. 2 is an inverted perspective view of the same. Fig. 3 is a longitudinal section thereof on the line 3 3 of Fig. 1. Fig. 4 is a perspective view showing the parts arranged to turn the device into a scraper. Fig. 5 is a perspective view of the comb looking at the under side thereof, the parts being arranged as in Fig. 4. Fig. 6 is a longitudinal section of the same on the line 6 6 of Fig. 4. Fig. 7 is a perspective view of the combined cleaner and scraper members detached from the comb-frame.

In the practical arrangement of my invention the comb-body A comprises a series of comb members $a\ a\ a$, $\sqcap$-shaped in cross-section, the lower edges $a'\ a'$ of which are serrated or toothed and curved in the direction of their length, as shown, and the several members $a\ a$ are rigidly held in parallel relation by the end braces $a^2\ a^2$, riveted to the tops of the said members $a\ a$. The members $a\ a$ are further braced by the centrally-disposed flat tang extension $b$, the upwardly and rearwardly bent-up portion $b'$ of which carries the handle B.

The combined cleaner and scraper devices consist of a series of $\sqcap$-shaped members $c\ c\ c$ of such width as to snugly fit and have movement within the $\sqcap$-shaped comb members $a$, and the said members $c\ c$ are, however, of less depth than the members $a\ a$, whereby when the members $c\ c$ are at their normal position, as best shown in Figs. 2 and 3, their lower edges $c'$, which are curved in planes parallel with the curvature of the tooth edges of the combing members, will be in a plane above the combing-teeth, as clearly shown in Fig. 3.

The several end members $c$ each have a pair of short posts or uprights $c^2\ c^2$ disposed one at each side of the center thereof and which pass up through apertures $a^3$ in the members $a\ a$ and have their upper ends fixedly connected to a shifting spider frame or plate $c^3$, having four arms or corner members $3^c$, with each of which one of the uprights $c^2$ connects. The plate $c^3$ is normally held to its uppermost position by the tension of the coiled springs $d\ d$, interposed between it and the top of the comb-frame, and for economy in construction and also to provide for an even play of the scraper and cleaner device but one pair of springs $d\ d$ is employed, that are mounted around the central pair of uprights, as indicated by $2^c$ on the drawings.

F designates the lever, the front end of which is forked and pivotally connects with the cross-pin $g$ in the upper end of a member $c^4$, fixedly mounted on the front end of the tang $b$, and the rear end of the said lever F is bent upwardly and rearwardly over the front end of the handle B and terminates in a flattened thumb-piece $f^2$, adapted when forced down to the position shown on Fig. 4 to be engaged by a latch or detent $h$, pivotally mounted on the handle B in such manner that the user when he presses the thumb end of the lever down the said latch can be instantly swung up by finger manipulation to lock the said thumb end to its depressed position.

From the foregoing, taken in connection with the accompanying drawings, the operation and advantages of my invention are believed to be apparent. It will be noticed that when the lever F is disengaged from the latch $h$ the springs $d\ d$ force the spider-plate $c^3$ up, and thereby bring the lower edges of the members $c$ above the comb-teeth, and this leaves the device in condition to be used as an ordinary currycomb. To clean the teeth, the user need only with his thumb press slightly on the lever F and work the lever to cause the frame $c^3$, with the members $c\ c$, to move up and down sufficiently to clean the teeth, thereby avoiding the necessity of knocking the comb against the sides of the stall or other solid abutment. To adjust the device as a scraper, the user presses the thumb-lever down to the limit and swings the latch $h$ over to lock it and hold the lower edges of the members $c\ c$ below the comb-teeth, and thus turn the device into a scraper.

The springs $d$ in practice are of such tension that when compressed under the full depression of the spider-frame they produce practically a solid bearing between the spider plate or frame $c^3$ and the top of the comb-frame, and thereby hold the scraper members practically rigid to their scraping position.

The latch or detent $h$ has a shank which passes through the handle B and through the tang member portion $b'$, which serves to secure the said tang and handle from becoming readily disconnected.

Having thus described my invention, what I claim, and desire to secure by Letters Patent, is—

1. An improved currycomb comprising a frame having a series of transverse combing-bars, scraper-blades supported on the frame adjacent the combing-bars, means for moving said scraper-blades over and beyond the toothed bars and means for sustaining said scraper-bars with their edges beyond the toothed bars, as set forth.

2. A currycomb consisting of a plurality of fixedly-connected comb-sections each U-shaped in cross-section and having their lower edges toothed, and a handle connected to said comb-sections; of a cleaner-frame movable within each of the U-shaped comb members and adapted to move over and beyond the toothed edges of the comb members, and a means mounted on the U-shaped frame members for moving the said cleaner-frames and projecting their edges beyond the toothed portions of the U-shaped members and a locking device for holding the cleaner-frame to its outermost position as set forth.

3. In a currycomb of the character described, the combination with the transversely-disposed U-shaped comb members, and a U-shaped cleaner-frame movable within each one of the U-shaped comb members adapted to have their lower edges projected beyond the lower edges of the comb members, of a means mounted upon the comb members for imparting movement to the U-shaped cleaner-frames and for holding the said cleaner-frames to their outwardly-adjusted position, as set forth.

4. As an improvement in currycombs of the character stated, the combination with the frame consisting of a series of transversely-disposed U-shaped toothed combing members, a handle member rigidly secured thereto; cleaner devices each consisting of a U-shaped body movable within the U-shaped comb members, a spider-frame located above the comb-frame, said spider-frame having a series of pendent arms movable through the comb-frame and fixedly connected to the cleaning members, a lever pivotally connected with the combing-frame and bearing upon the upper side of the spider-frame, springs for forcing the spider-frame to its normal or upper position, and a locking device for engaging the lever and holding it to its depressed position whereby to project the cleaner-frames beyond the comb edges for the purposes described.

5. In a currycomb of the character described, a cleaner device movable over the combing edges of the comb, a means for moving said device to project beyond the combing edges of the comb and another means for holding the first means adjusted to sustain the cleaner device in a substantially rigid position when projected beyond the combing edges of the comb, as set forth.

KNUT T. NESTE.

Witnesses:
H. H. GERLEID,
L. B. WHITNEY.